April 18, 1933.  J. D. ZAHM ET AL  1,904,188
ANIMAL TRAP
Filed Feb. 9, 1931  3 Sheets-Sheet 1
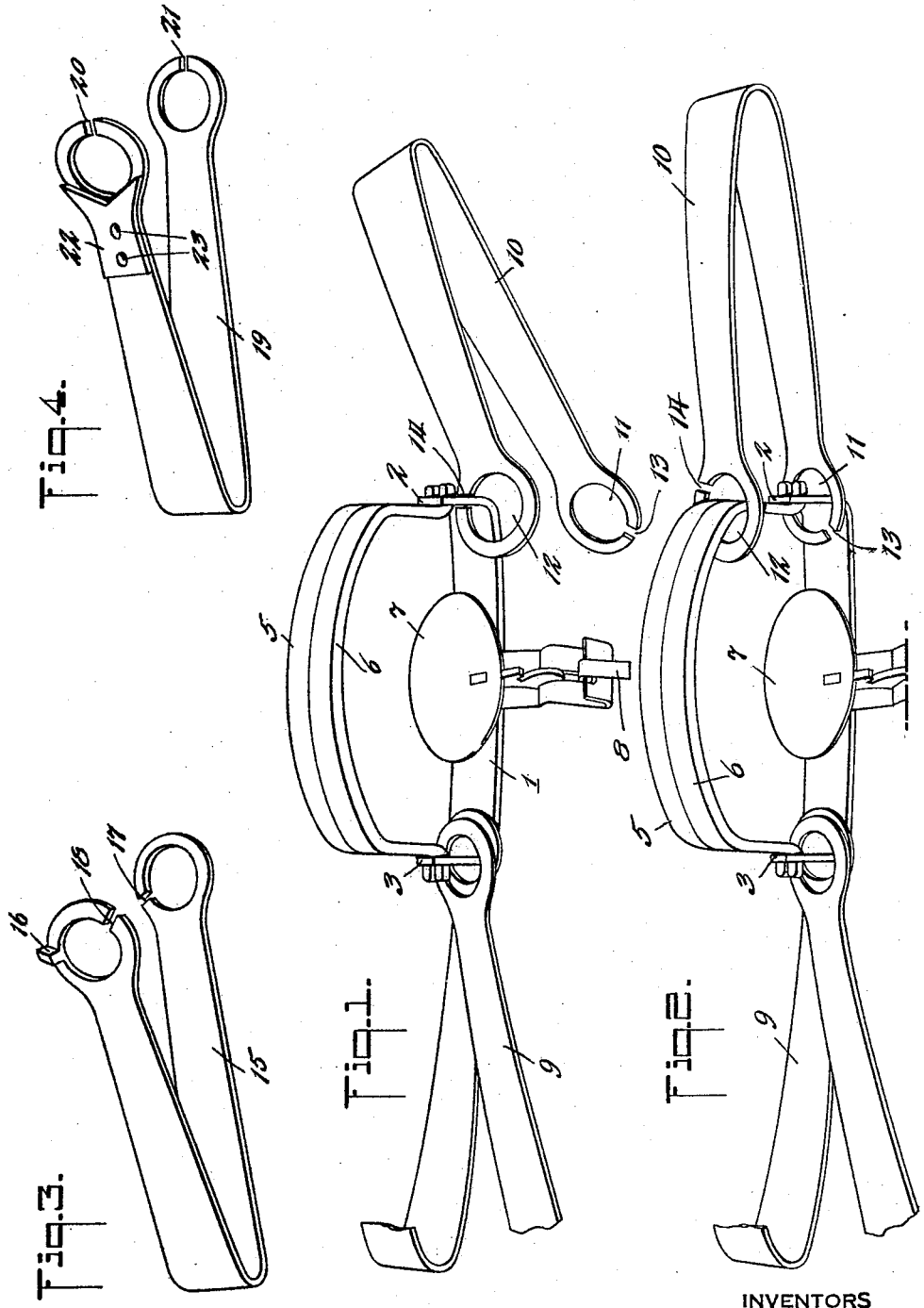
INVENTORS
JOSEPH D. ZAHM
& JOHN U. LEHN
BY
ATTORNEYS

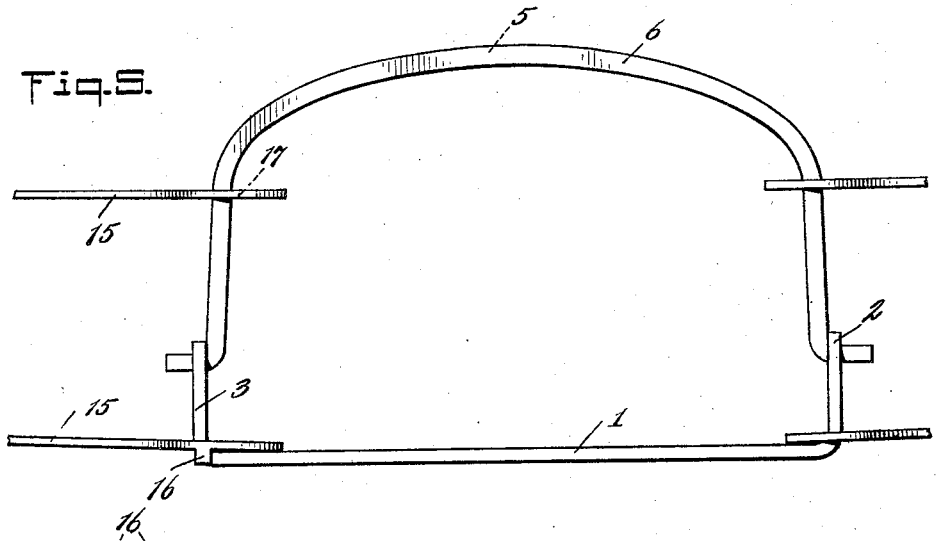
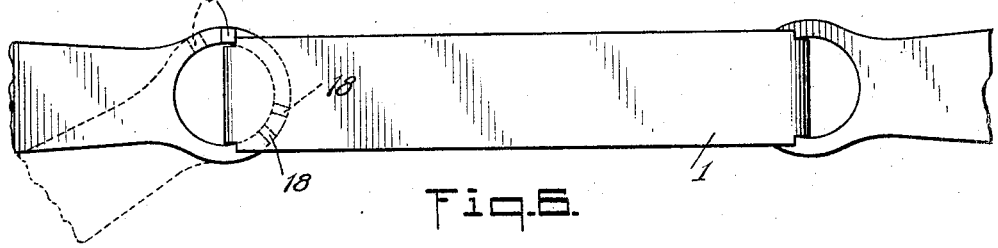
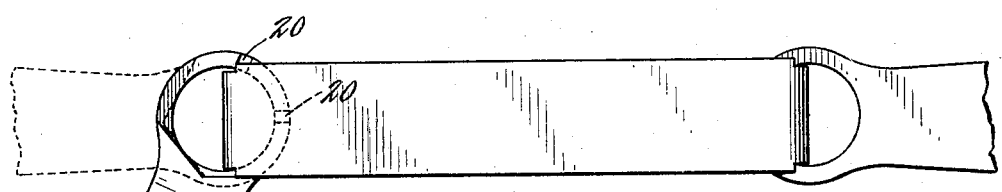
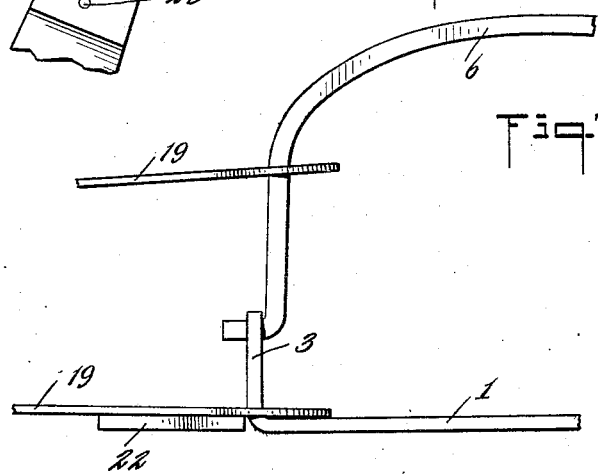

April 18, 1933.   J. D. ZAHM ET AL   1,904,188
ANIMAL TRAP
Filed Feb. 9, 1931   3 Sheets-Sheet 3
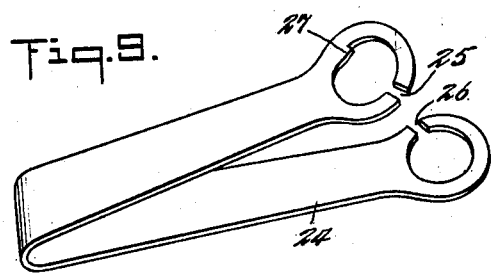
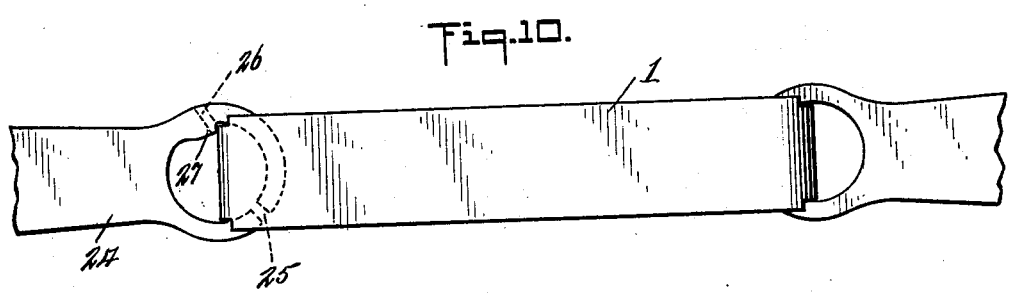
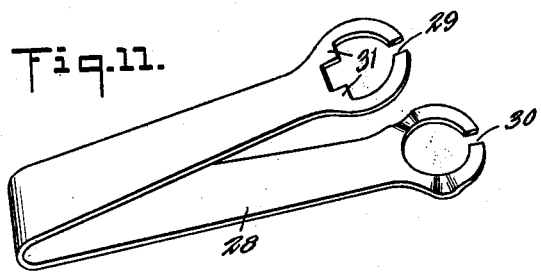
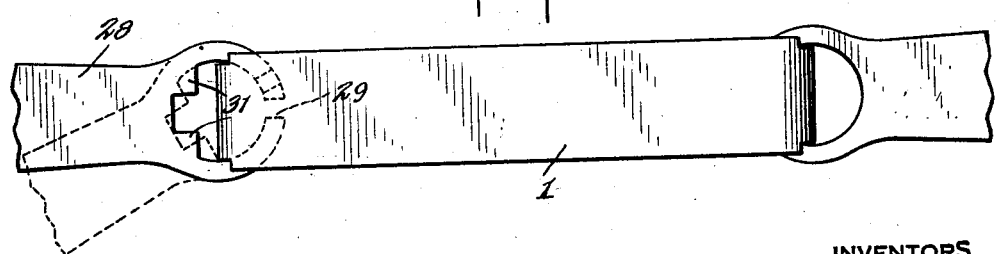
INVENTORS
JOSEPH D. ZAHM
& JOHN U. LEHN
BY
ATTORNEYS Patented Apr. 18, 1933

1,904,188

UNITED STATES PATENT OFFICE

JOSEPH D. ZAHM AND JOHN U. LEHN, OF LITITZ, PENNSYLVANIA

ANIMAL TRAP

Application filed February 9, 1931. Serial No. 514,338.

This invention relates to animal traps and particularly to improvements in the springs adapted to be applied thereto.

The invention is concerned with detachable auxiliary or supplementary springs such as are disclosed in the specification of our prior application No. 484,494 filed on September 26, 1930.

The main object of the invention is to provide an improved form of such a detachable spring and more particularly to provide a spring which normally cannot be detached from the trap by any accidental manipulation, when once the spring is in position.

A more specific object of the invention is to provide a detachable spring for an animal trap having one or more apertures, lugs or detents, arranged and adapted to prevent the rotation of the spring in such a manner as would normally cause its ultimate detachment. In such a form of construction one preferred embodiment comprises a lug on one of the limbs of the spring adapted to contact with the base of the trap and prevent its rotation to such an extent that the jaws of the trap would pass through the slots in the end of the spring.

Further objects and features of the invention will be apparent from the following detailed description given in conjunction with the accompanying drawings:—

In the accompanying drawings Figure 1 shows a two-jaw animal trap having one form of spring according to this invention applied thereto;

Figure 2 is a view similar to Figure 1, with the auxiliary spring in operative position;

Figure 3 is an underside view of a modified form of spring;

Figure 4 is an underside view of a third modification;

Figure 5 is an enlarged detailed view of the spring shown in Figure 3, applied to a two-jaw trap;

Figure 6 is an underside view of the construction shown in Figure 5;

Figure 7 is a view similar to Figure 5 showing the application of the spring as illustrated in Figure 4;

Figure 8 is an underside view of the construction shown in Figure 7;

Figure 9 is an underside perspective view of a still further modification;

Figure 10 is an underside view similar to Figures 6 and 8 showing the spring of Figure 9 applied to the trap;

Figure 11 is an underside perspective view of a fourth modification; and

Figure 12 is an underside view similar to Figure 10 showing the spring of Figure 11 applied to the trap.

The form of spring to which the present invention particularly relates is one adapted to be attached to an animal trap after complete assembly so that it can form either a replacement spring in the case of the breaking of the ordinary spring, or a supplementary spring adapted to re-enforce and augment the spring pressure of the existing spring. Any preferred embodiments such as springs as disclosed and claimed in our prior application referred to, are U-form and have circular apertures at their rounded ends and also slots through which the appropriate parts of the trap can pass so as to be within the circular apertures. Under certain circumstances such a form of spring, if accidentally rotated or moved beyond a certain position, will bring one of the slots opposite the edge of the jaw or base of the trap so that the tendency is for such part of the jaw or base to pass into the slot and thus render the spring action ineffective. In accordance with this invention, therefore, we arrange the slots, or we provide lugs or like detents upon the spring, so that the relative movement between the slot and the part of the jaw or base adjacent thereto will not effect the passage of such part through the slot.

One form of the invention is illustrated in Figure 1 and the trap comprises the usual base member 1 with upstanding ends 2 and 3 to which are pivoted the usual jaws 5 and 6. Upon the base is a trip pan 7 associated with a catch 8. In the trap illustrated the normal spring 9 attached to the upturned end 3 has been broken and in order, therefore, to render the trap operative again a detachable form of spring is applied. Such a form of spring is shown at 10 and is of a U-form having rounded ends and circular apertures 11 and 12. The associated slots of these apertures are shown at 13 and 14.

In one usual form of trap of this type, the thickness of the jaws is greater than the thickness of the base, and, therefore, in accordance with this modification of the invention, we form the slots 13 and 14 so that they are of less width than the thickness of the jaws. In order therefore to apply such a form of spring to the trap we pass the upstanding end 2 through the slot 14 which is formed in the upper limb of the spring 10, and we subsequently raise the upper limb until the jaw members lie within the aperture 12, as illustrated in Figure 2. When the spring is so positioned it is turned and the lower limb is manipulated so that the upstanding end 2 of the base is passed through the slot 13. The spring is then again turned to its proper longitudinal position, as shown in Figure 2, and it will be seen by virtue of the fact that the thickness of the jaws is greater than the width of the slot 14, such jaws cannot pass through the slot no matter how the spring is turned. It is practically impossible, therefore, for any accidental manipulation to render the spring ineffective.

In the second modification illustrated in Figure 3, we form on the underside of the circular portion of the lower limb of the spring 15, a lug or detent 16. The slots 17 and 18 in this form of spring are in opposite quadrants of the circular portions, and the lug 16 and the slot 18 are in adjacent quadrants. The spring shown in Figure 3 is illustrated in Figure 5 as applied to the upstanding end 3 of the usual form of trap illustrated in Figures 1 and 2. The spring is attached to the trap in the usual way by passing the appropriate parts of the upstanding portions of the base and of the jaws through the appropriate slots, and without assembly it will be seen that the lug 16 abuts against the base 1 so that the spring cannot be turned in a clockwise direction, as illustrated in Figure 6. In this position it will be noted that the slot 17 is just clear of the jaw 5, and that therefore the spring cannot be turned any further so as to bring the slot 17 opposite the edge of the jaw. Movement to the dotted line position in the construction shown in Figure 6 moves the slot 17 away from the edge of the jaw 5. There is thus provided a positive detent or stop which prevents the rotation or movement of the auxiliary spring to such a position that normally such spring would become ineffective due to the passage of the jaw or jaws through the adjacent slot in the rounded end. We appreciated, of course, that placing the spring upon the other end of the base, the lug 16 will be placed upon the opposite side of the rounded end but in the same relative position to the slots which are cut for the same adaption.

A further modification is shown in Figure 4 where the spring 19 has its slots 20 and 21 in the same relative position: longitudinal of the spring and at the end of the rounded portion. Such a form of spring can be used on either end of the trap and in accordance with this invention, in order to prevent the trap slipping out through the slots, a V-shaped piece 22 as attached to the underside of the lower limb as by rivets 23. It will be seen by referring to Figures 7 and 8 that the spring can partake only of a limited rotational movement due to the fact that the wings of the V-shaped piece contact with the base 1, and thus, once the spring is placed in position, no form of accidental rotation can bring the slots into the danger position such as would normally render the trap ineffective. It is obvious that in such a form of spring the V-shaped piece could be replaced by a pair of lugs similar to lug 16, as illustrated in Figures 3, 5 and 6.

In Figure 9 the spring 24 has slots 25 and 26 in its lower and upper limbs respectively. On the inner part of the circular opening of the lower limb is a lug 27 which effects the required limitation of movement. To apply this form of spring the slots are made sufficiently wide to slip the spring ends over the jaws: the lower limb is first slipped over the jaws, the spring is then compressed and the upper limb slipped into place. The spring is then turned and lowered into position before releasing the pressure. It will be seen from Figure 10 that the lug 27 prevents the turning of the spring sufficiently to bring the slot 26 opposite the jaw edge, not shown, or the slot 25 into alignment with the up-turned end of the base.

Obviously a reversal of slots and lug from those shown in Figs. 9 and 10 into opposite quadrants of the circular apertures of the spring would reverse the direction in which it could be turned, and therefore, adapt it for use on the opposite end of the trap.

In Fig. 11 the spring 28 has straightly aligned slots, 29, 30 and two lugs 31 positioned similarly to the single lug in Fig. 9 on the inner rim of the circular aperture. These lugs as will be seen from the dotted position of Fig. 12 prevent the slots from aligning themselves with the jaw edges and the up-turned end of the base. As with the construction of Fig. 9, the slots are wide enough to slip over the jaws and the spring is attached by first compressing it and slipping both ends over the jaws, and then turning it into alignment with the base and dropping it into position before releasing the pressure.

While we have shown three modifications of the invention, it will be obvious that further modifications may be made and alterations may be effected while still retaining the effective function of the spring, as hereinbefore indicated, and as set out in the appended claims.

What we claim is:

1. An auxiliary spring for an animal trap, of U-form, and having rounded ends and apertures and a slot leading into each of said apertures, means being provided to prevent rotation of said spring on said trap beyond a limiting position.

2. An auxiliary spring for an animal trap, having slots for the passage of parts of said trap therethrough and having a lug to contact with a part of said trap, to restrain the spring from turning in one direction.

3. An auxiliary spring of U-form for attachment to an animal trap having a base, a lug positioned on said spring to abut against said base and move relative thereto and thus prevent the accidental detachment of said spring from said trap.

4. An auxiliary spring of U-form for attachment to an animal trap said spring having rounded ends with apertures and slots therein, said slots being in opposite quadrants, and a lug on the underside of one of said ends in a quadrant adjacent its associated slot.

5. An auxiliary spring of U-form for attachment to an animal trap said spring having rounded ends with slots therein, a V-shaped member being positioned on the underside of one of said ends to abut against a part of said trap to prevent the accidental detachment of said spring therefrom.

6. An auxiliary spring for an animal trap having a base, comprising a U-shaped member, having rounded ends with apertures and slots therein, said slots being longitudinal of said spring, a pair of abutment members being provided on the underside of one of said ends and positioned to contact with said base.

7. An auxiliary spring according to claim 2 having circular apertures into which parts of said trap may be passed through said slots, said lugs being on the inner edge of one of the annular portions of said apertures to prevent rotation of said spring when attached.

8. An auxiliary spring for an animal trap having a base, comprising a U-shaped member, having rounded ends with apertures and slots therein, said slots being longitudinal of said spring, a pair of abutment members being provided adjacent the inner edge of one of said apertures to contact with said base.

9. An auxiliary spring for an animal trap, having an aperture at each end, a slot leading to each aperture, said spring having means to prevent its accidental detachment from said trap.

In testimony whereof we affix our signatures.

JOSEPH D. ZAHM.
JOHN U. LEHN.